Patented Nov. 19, 1940

2,222,000

UNITED STATES PATENT OFFICE 2,222,000

PROCESS FOR THE PRESERVATION OF EGGS AND FRESH FRUIT

Erich Kurt Julius Schmidt, Munich, Germany

No Drawing. Application May 24, 1938, Serial No. 209,809. In Great Britain June 2, 1937

4 Claims. (Cl. 99—166)

This invention relates to the preservation of eggs and fresh fruit.

It is known that for such preservation of eggs disinfectant aqueous emulsions of fats and paraffins have been proposed as being especially efficacious. The emulsions proposed for use have not proved sufficiently efficient to retain the good-keeping qualities of fresh eggs for sufficient lengths of time. The reason for this defect of the known emulsions may be attributed to the fact that considerable quantities of electrolytes are used in their preparation. It is known that electrolytes diffuse through egg shells into their interiors and change the condition and the taste of the fresh eggs.

By experimenting with fresh fruits it was found that even small amounts of electrolytes accelerate the decay of fresh fruit. Therefore any attempts to preserve fresh fruit by means of disinfectant emulsions of fats or paraffins containing water, such as have been described hitherto, are unsuccessful since these emulsions invariably contain electrolytes.

It follows that the absence of electrolytes in any such emulsions is an essential condition for the successful preservation of fresh fruit.

It is an object of this invention to overcome these disadvantages and to provide a satisfactory, cheap and convenient process for preserving eggs and fresh fruit.

According to the process of this invention the eggs or fresh fruit are coated with a solid emulsion of an aqueous solution of a non-electrolyte which prevents putrefaction and fermentation in a substance selected from the group consisting of carefully prepared neutral lanoline and mixtures of solid and liquid paraffins.

Examples of such non-electrolytes are the esters of hydroxy-benzoic acids such as the ethyl or propyl esters of p-hydroxy-benzoic acid such esters being known as Solbrol A and Solbrol P respectively.

The non-electrolytes are advantageously emulsified in the form of aqueous solutions or suspensions or partly in solution and partly in suspension with agar-agar or other non-electrolytes having the requisite emulsifying properties such as the products sold by the I. G. Farbenindustrie A. G. under the registered trade-marks "Emulphor" and "Tylose."

Emulphor is a yellowish-brown compound of high molecular weight resembling a wax. It gives a neutral solution with water and is used as an emulsifying agent for fats, oils and mineral oils (see Textil-Hilfsmittel Tabellen by J. Hetzer, page 49).

Tylose is a methyl cellulose giving a neutral solution with water and is stable to light, air and alkali. It is coagulated by heat (see Chemiker Zeitung 1932, page 158, and Textil-Hilfsmittel Tabellen by J. Hetzer (1933), page 188).

The solid emulsion may be prepared as follows:

Paraffin wax of melting point 68–72° C. and liquid paraffin are heated to 70–80° C. and a hot solution of the emulsifying agent such as agar-agar in water containing the non-electrolyte such as an ester of p-hydroxy-benzoic acid partly dissolved and partly in suspensions as fine oily drops is added thereto. The mixture while cooling down gradually is thoroughly stirred until the emulsion begins to solidify.

Alternatively the solid emulsion may be prepared as follows: Paraffin wax and liquid paraffin are melted together and the emulsifying agent such as octadecyl alcohol and the non-electrolyte such as an ester of p-hydroxy-benzoic acid dissolved therein. Boiling water is then emulsified in the solution obtained. The mixture is allowed to cool down gradually and is thoroughly stirred until the emulsion begins to solidify.

The emulsions have neither colour nor taste. They are harmless to health and can be stored indefinitely. They are excellently suited for coating eggs and can be spread in a fine film on the untouched or cleaned and disinfected eggs by hand, by rubbing over with cloth or by brushing or by machine. It has been found that the solid emulsion of this invention adhere closely to the surfaces of the eggs which by reason of the elastic nature of the coatings become less susceptible to damage from shocks.

Eggs which have been coated with solid emulsions prepared in accordance with this invention keep in an unchanged condition and retain their taste for from at least eight months up to eighteen months. They are not susceptible to any changes of temperature when taken for example out of cold storage.

Fresh fruits especially citrus fruits treated by the process of this invention preserve their important qualities for several months. The use of cold storage rooms is thus rendered unnecessary. The process of this invention prevents fruit from wrinkling and prevents an increase of the hardness and a darkening of the colour. Even after several months' storage such fruit appears unchanged and excellent. The coherent coat of the emulsion used decreases very appreciably the rate of loss of water and volatile constituents of the fruit, so that the commercial loss through decrease in weight is even after several months only insignificant.

Moreover the process of this invention slows down the ripening process and over-ripeness is avoided, thereby preventing increasing decay and deterioration of taste and also preventing a noticeable decrease in the amount of vitamins.

Since it is impossible to determine the exact moment at which the process of over-ripening sets in, the export of fresh fruit is a matter of considerable difficulty. Commercial losses incurred thereby can be avoided by the process of this invention which also renders it possible for fruit picked in large quantities during short intervals to be sold over longer periods in which fresh fruit has not hitherto been available.

The coating provided by this invention which also offers protection against damage caused by frost can be removed by mere rubbing or by washing with hot water. In most cases the paste could remain on the fruit since the emulsions employed have neither taste nor smell and are harmless to health.

The efficiency of the emulsion is considerably increased if the fruit or the eggs are cleaned before coating. As cleaning agents there may be used neutral wetting and emulsifying substances such as Gardinol WA (the word "Gardinol" being a registered trade-mark) if desired together with disinfectants such as the Solbrols. Gardinol WA is a white neutral powder which wets, cleans and emulsifies and is stable towards alkalies, acids, salts, and hard water (see Textil—Hilfsmaterial-Tabellen (1933) Dr. J. Hetzer).

The emulsions can be spread in a fine film on the fruit by hand, by rubbing over with cloth, by brushing or by suitable machines.

The following emulsions in which the parts are by weight have been found satisfactory for the preservation of eggs and fresh fruit.

|   |   | Parts |
|---|---|---|
| 1. | Paraffin wax m-pt. 68–72° C | 45 |
|   | Liquid paraffin | 55 |
|   | Agar-agar | 0.2 |
|   | Solbrol A (ethyl ester of p-hydroxy-benzoic acid) | 2.0 |
|   | Solbrol P (propyl ester of p-hydroxy-benzoic acid) | 2.0 |
|   | Water | 20.0 |
| 2. | Paraffin wax m-pt. 68–72° C | 50 |
|   | Liquid paraffin | 50 |
|   | Agar-agar | 0.2 |
|   | Solbrol A | 4.0 |
|   | Solbrol P | 4.0 |
|   | Water | 20.0 |
| 3. | Paraffin wax m-pt. 68–72° C | 15 |
|   | Liquid paraffin | 50 |
|   | Gum of the seed of the carob tree | 0.2 |
|   | Solbrol A | 2.0 |
|   | Solbrol P | 2.0 |
|   | Water | 20 |
| 4. | Paraffin wax m-pt. 68–72° C | 35 |
|   | Paraffin wax m-pt. 46–48° C | 15 |
|   | Liquid paraffin | 50 |
|   | Agar-agar | 0.2 |
|   | Solbrol A | 2 |
|   | Solbrol P | 2 |
|   | Water | 20 |
| 5. | Paraffin wax m-pt. 68–72° C | 15 |
|   | Paraffin wax m-pt. 56–58° C | 10 |
|   | Paraffin wax m-pt. 52–53° C | 10 |
|   | Paraffin wax m-pt. 46–48° C | 10 |
|   | Paraffin wax m-pt. 42–44° C | 15 |
|   | Liquid paraffin | 40 |
|   | Solbrol A | 2 |
|   | Solbrol P | 2 |
|   | Octadecyl alcohol (emulsifying agent) | 2 |
|   | Water | 20 |
| 6. | Paraffin wax m-pt. 68–72° C | 15 |
|   | Paraffin wax m-pt. 56–58° C | 10 |
|   | Paraffin wax m-pt. 52–53° C | 10 |
|   | Paraffin wax m-pt. 46–48° C | 10 |
|   | Paraffin wax m-pt. 42–44° C | 10 |
|   | Vaseline | 10 |
|   | Liquid paraffin | 35 |
|   | Solbrol A | 2 |
|   | Solbrol P | 2 |
|   | Octadecyl alcohol (emulsifying agent) | 2 |
|   | Water | 20 |

The expression "aqueous solution" as used herein includes a mixture of a solution and a suspension.

What I claim is:

1. A process for preserving eggs and fresh fruit which comprises coating the article to be preserved with a solid emulsion of paraffin wax, liquid paraffin, ethyl ester of p-hydroxy-benzoic acid, propyl ester of p-hydroxy-benzoic acid and water.

2. A process for preserving eggs and fresh fruits, which comprises coating the article to be preserved with a solid emulsion, one phase of the emulsion comprising substantially an admixture of an ester of p-hydroxy-benzoic acid partly in suspension and partly in solution in water and the other phase of said emulsion comprising substantially a substance selected from the group consisting of purified neutral lanoline and a mixture of solid and liquid paraffins.

3. A process for preserving eggs and fresh fruits, which comprises coating the article to be preserved with a solid emulsion, one phase of the emulsion comprising substantially an admixture of the ethyl ester of p-hydroxy-benzoic acid partly in suspension and partly in solution in water and the other phase of said emulsion comprising substantially a substance selected from the group consisting of purified neutral lanoline and a mixture of solid and liquid paraffins.

4. A process for preserving eggs and fresh fruits, which comprises coating the article to be preserved with a solid emulsion, one phase of the emulsion comprising substantially an admixture of the propyl ester of p-hydroxy-benzoic acid partly in suspension and partly in solution in water and other phase of said emulsion comprising substantially a substance selected from the group consisting of purified neutralanoline and a mixture of solid and liquid paraffins.

ERICH KURT JULIUS SCHMIDT.